United States Patent [19]
Dang

[11] Patent Number: 5,546,366
[45] Date of Patent: Aug. 13, 1996

[54] CARTRIDGE PICKER ASSEMBLY AND MODULAR LIBRARY SYSTEM

[75] Inventor: Chi H. Dang, Tucson, Ariz.

[73] Assignee: International Business Machines Corporation, Armonk, N.Y.

[21] Appl. No.: 260,614

[22] Filed: Jun. 16, 1994

Related U.S. Application Data

[63] Continuation of Ser. No. 48,436, Apr. 16, 1993, abandoned.

[51] Int. Cl.⁶ ............................ G11B 17/22; G11B 15/68
[52] U.S. Cl. ................................................. 369/36; 360/92
[58] Field of Search ........................ 369/34, 36, 191–193, 369/38, 39, 75.2, 77.1, 77.2, 178; 360/92, 98.04, 98.06; 414/267, 274, 277, 281, 282, 416, 283, 273, 751–753; 294/88, 103.1, 119.1

[56] References Cited

U.S. PATENT DOCUMENTS

| | | | |
|---|---|---|---|
| 3,831,197 | 8/1974 | Beach et al. | 360/71 |
| 3,888,362 | 6/1975 | Fletcher et al. | 414/753 |
| 4,042,122 | 8/1977 | Espy et al. | 414/751 |
| 4,566,087 | 1/1986 | Kraft | 369/34 |
| 4,608,679 | 8/1986 | Rudy et al. | 369/36 |
| 4,614,474 | 9/1986 | Sudo | 414/281 |
| 4,675,856 | 6/1987 | Rudy et al. | 369/34 |
| 4,817,070 | 3/1989 | Hug et al. | 369/36 |
| 4,827,463 | 5/1989 | Motoyoshi et al. | 369/36 |
| 4,855,980 | 8/1989 | Hug et al. | 369/36 |
| 4,998,232 | 3/1991 | Methlie et al. | 369/36 |
| 5,022,019 | 6/1991 | Motoyoshi et al. | 369/36 |
| 5,128,912 | 7/1992 | Hug et al. | 369/38 |
| 5,150,341 | 9/1992 | Shibayama | 369/36 |
| 5,206,845 | 4/1993 | Baxter et al. | 369/36 |

*Primary Examiner*—Stuart S. Levy
*Assistant Examiner*—Brian E. Miller
*Attorney, Agent, or Firm*—Baker, Maxham, Jester & Meador

[57] ABSTRACT

A recordable media cartridge picker assembly and library is provided wherein the library has the plurality of cartridge receptacles arranged in a matrix of stacked rows and side by side columns. A plurality of cartridge pickers are capable of removing or inserting a cartridge with respect to a cartridge receptacle when aligned therewith. A device is provided for selectively aligning each cartridge picker with cartridge receptacles in either column of a respective pair of columns. This device is also used for selectively transporting a cartridge between the columns. A device is also provided for interconnecting at least two of the cartridge pickers aligning and transporting devices. This device positions the two cartridge pickers for selective alignment and transportation between two pairs of columns, the two pairs of columns having one column which is common to both.

8 Claims, 6 Drawing Sheets

5,546,366

CARTRIDGE PICKER ASSEMBLY AND MODULAR LIBRARY SYSTEM

This application is a continuation of application Ser. No. 08/048,436filed Apr. 16,1993 now abandoned.

BACKGROUND OF THE INVENTION

1. Field of the Invention

The present relates to a cartridge picker assembly for use in a library containing cartridges of magnetic tapes or disks or cartridges of optical disks.

2. Discussion of the Related Art

Present robotic recordable media libraries are not modular. Typical robotic libraries include a track and train combination which carries a cartridge picker for removing or replacing cartridges any place within the library. This generally requires two tracks, one along the full length of the library and one along the height of the library. Another major type of robotic library includes a carousel which is selectively rotated and a cartridge picker which is selectively moved up and down with respect to the carousel. Other types of libraries are even more sophisticated, including a robotic arm which is selectively positioned anywhere within the library for removal or replacement of recordable media cartridges.

One of the major problems with prior art robotic recordable media libraries is that they are fixed in size. When a user wants, for example, a medium size robotic library, the manufacturer may have only large and small sizes available. This forces a manufacturer to have an array of sizes available which complicates the manufacturing lines and requires a large inventory. There is a desperate need for modular robotic libraries so that the size requirements of a customer can be easily met.

Another problem with robotic libraries is that when a user desires an expansion of his existing library, the practice is to replace the existing library with a new one. This is very costly and results in a temporary nonavailability of the library. Library modules should be compatible so that when the user desires a larger library an additional module or modules can be added to satisfy his size requirements.

Another major problem with prior art robotic libraries is that when there is a malfunction of one of the operative components, the whole library is shut down and rendered useless. It would be desirable to keep a majority of the library operational when there is a failure of one or more components.

It would also be desirable that installation of a robotic recordable media library be made easier from the standpoints of manual lifting and accuracy of alignment.

SUMMARY OF THE INVENTION

The present invention overcomes the aforementioned problems associated with prior art robotic recordable media libraries by providing a cartridge picker assembly and library which can be made and installed in modular form. This may be accomplished by providing a library which has a plurality of cartridge receptacles arranged in a matrix of stacked rows and side by side columns. The receptacles can be provided by cartridge holders or cartridge drives. The cartridges to be stored or driven may contain magnetic tape or disks or optical disks as desired. A plurality of cartridge pickers are provided wherein each cartridge picker is capable of selectively removing or inserting a cartridge with respect to a cartridge receptacle when it is aligned therewith.

A device is provided for selectively aligning each cartridge picker with cartridge receptacles in either column of a respective pair of columns and for selectively transporting cartridges therebetween. The modular feature is realized by a device which interconnects at least two of the cartridge pickers aligning and transporting devices in a particular relationship with respect to the columns of receptacles. This interconnecting device positions the two cartridge pickers for selective alignment and transportation between cartridge receptacles in two pairs of columns wherein the two pairs of columns have one column which is common to both. This means that while each cartridge picker serves its respective pair of columns, one of the columns in each pair is common to both pairs of columns so that the two cartridge pickers serve a common column. With this arrangement, the smallest modular library would comprise three columns and two cartridge pickers.

An object of the present invention is to provide a recordable media cartridge picker assembly and library which overcomes the aforementioned problems associated with prior art robotic libraries.

Another object to provide a recordable media cartridge picker assembly and library which can be made modular for easier construction, installation and expansion.

A further object is to provide a modular robotic library which is not rendered completely inoperable when one of its cartridge transporting devices fails.

Still another object of the present invention is to accomplish the aforementioned objects and yet enable easy serviceability of a failed component while the remainder of the robotic library is still in use.

These and other objects of the invention will be better understood from the following detailed description, taken together with the below described drawings.

DETAILED DESCRIPTION OF THE PREFERRED EMBODIMENTS

Figure 1:
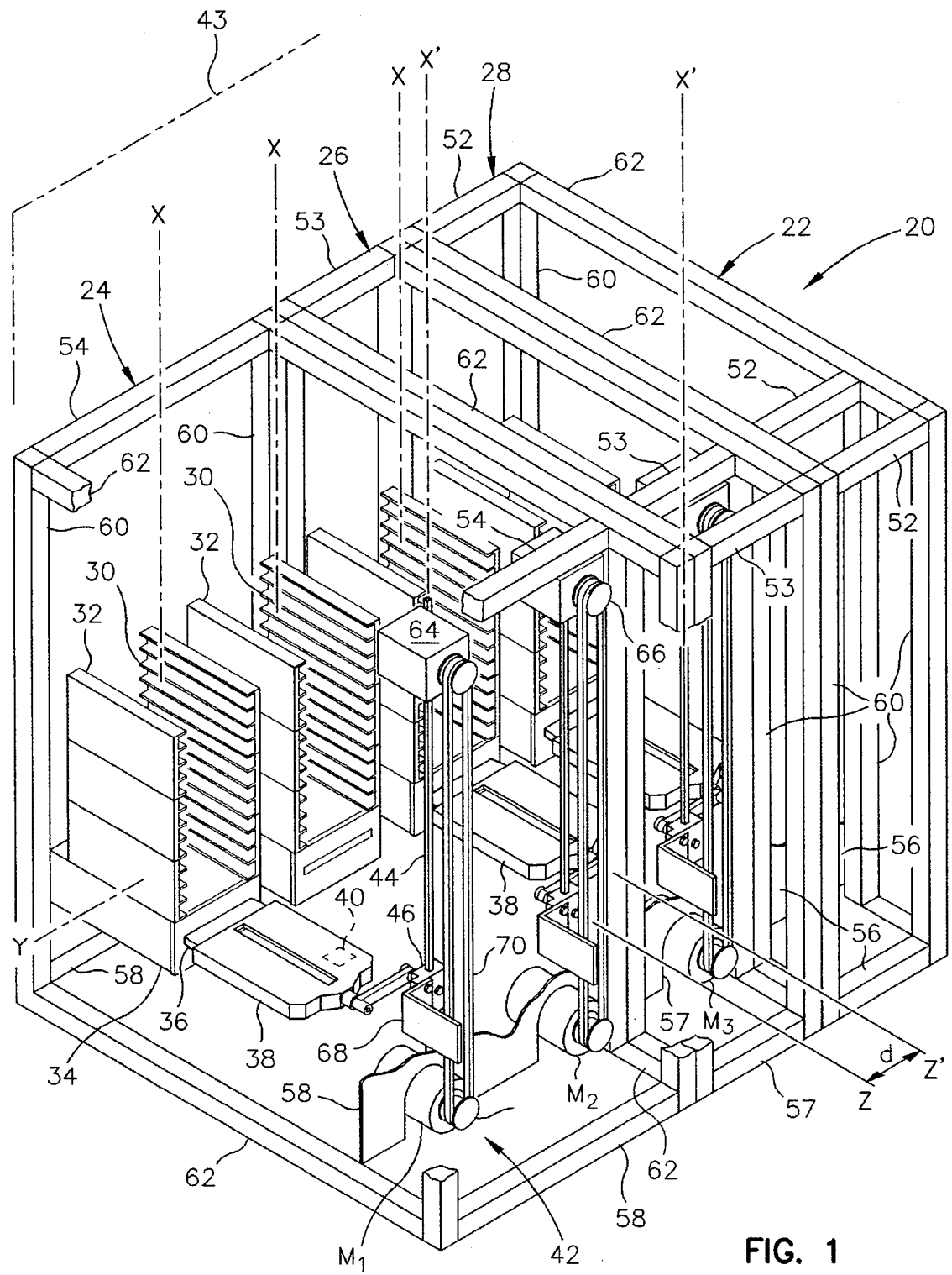
FIG. 1 is an isometric view of an exemplary recordable media cartridge picker assembly and library.

Referring now to the drawings wherein like reference numerals designate like or similar parts throughout the several views there is illustrated in FIG. 1 a recordable media cartridge picker assembly and library 20 which may include a support assembly, such as a framework 22, and modular components 24, 26 and 28 which will be described in more detail hereinafter. The library includes a plurality of cartridge receptacles 30 which are arranged in a matrix of stacked rows and side by side columns 32. The cartridge receptacles 30 may be for either cartridge storage compartments or for one or more tape drives 34, as shown. In the exemplary embodiment of FIG. 1, a tape drive 34 is mounted at the bottom of each column, however, it should be understood that the tape drive could be mounted at the top of or between the top and bottom of a respective column. As will be explained in more detail hereinafter, one tape drive could be utilized for an entire picker assembly and library, however, flipping of the cartridge picker in some embodiments may be omitted by utilizing at least two cartridge drives. In the embodiment shown in FIGS. 2 and 3, the picker assembly and library 20 are made for use with optical storage cartridges, one of which is illustrated at 36 in FIG. 2. It should be understood that the invention could also be used to handle cartridges of magnetic tape or disks.

Figure 2:
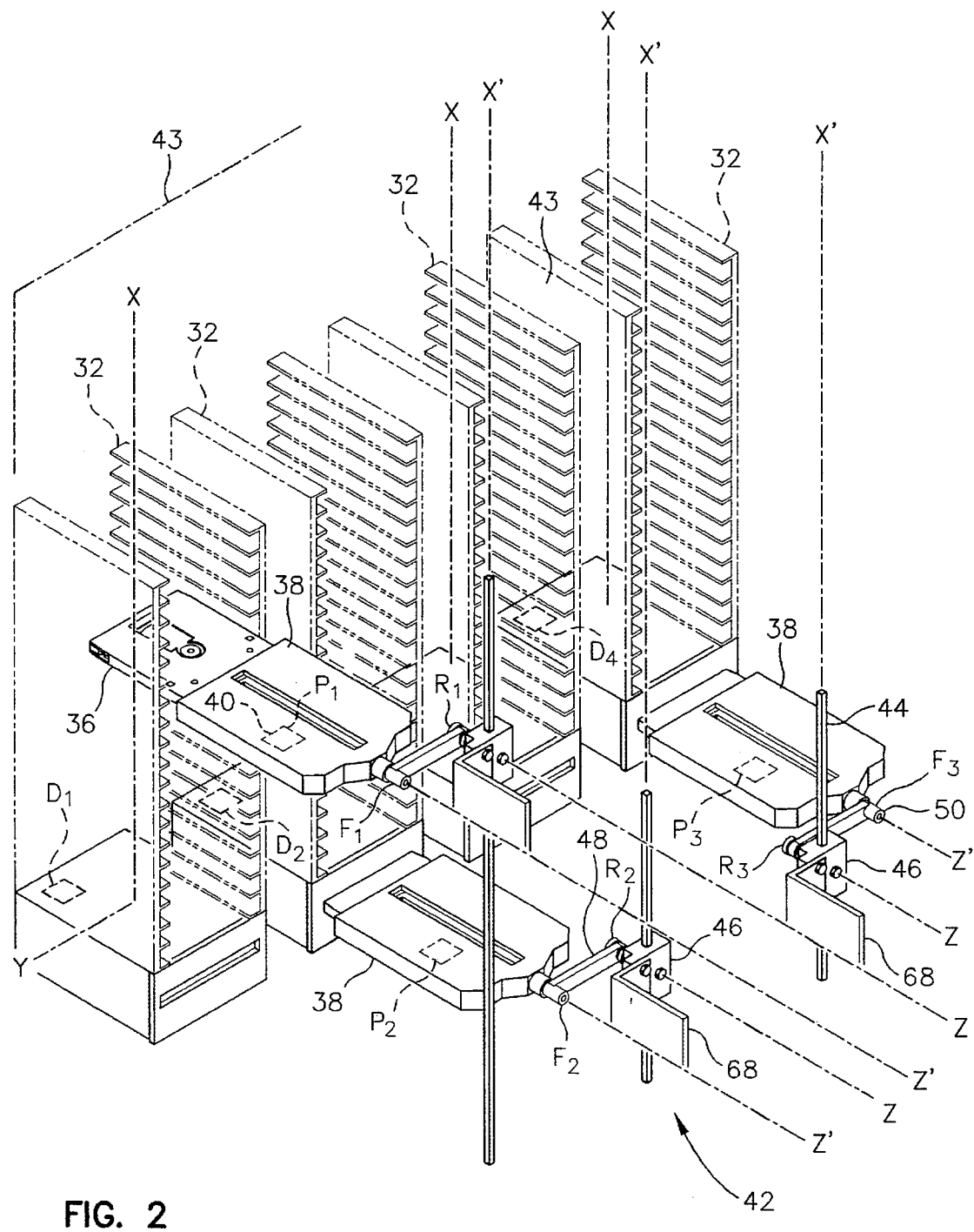
FIG. 2 is an isometric view of a portion of the assembly and library of FIG. 1 with portions removed to illustrate various details thereof.

As shown in FIGS. 1 and 2, a plurality of cartridge pickers 38 are provided. Each cartridge picker 38 is capable of removing or inserting a cartridge from or in a cartridge receptacle 30 when aligned therewith. As shown in FIG. 1 the closest cartridge picker 38 is shown aligned with the receptacle of the closest tape drive 34 for the removal or insertion of the optical cartridge 36. In the same manner the cartridge picker 38 can be aligned with any other cartridge receptacle 30 in either of the two closest columns 32, shown in FIG. 1. The optical cartridge picker 38 is well known in the art. Briefly, the optical cartridge picker 38 has internal fingers (not shown) which are actuated by internal power means, shown schematically at $P_1$, $P_2$ and $P_3$ in FIG. 2, for grabbing or pushing an optical disk. A suitable optical cartridge picker is illustrated in a U.S. Pat. No. 4,827,463 entitled "Disk Memory Device" to Motoyoshi, et al. As will become apparent hereinafter, the number of cartridge pickers 38 utilized in any embodiment can be one less than the number of columns 32 of cartridge receptacles 30.

An apparatus is provided for selectively aligning each cartridge picker 38 with cartridge receptacles 30 in either column 32 of a respective pair of columns and for selectively transporting a cartridge 36 therebetween. The aligning and transporting apparatuses for three cartridge pickers are generally illustrated at 42 in FIGS. 1 and 2 and are located in a particular relationship with respect to x and y axes of the recordable media library. Accordingly, these axes will be described before providing additional details on the cartridge picker aligning and transporting apparatuses. As shown in FIGS. 1 and 2, each column 32 of cartridge receptacles 30 of the library has respective x and y axes which intersect perpendicularly substantially at the center of the column and which are parallel with the x and y axis respectively of each other column of cartridge receptacles. The x and y axes of all of the columns lie substantially in a common plane, shown in phantom at 43 in FIGS. 1 and 2.

As shown in FIG. 2, the cartridge picker aligning and transporting apparatuses 42 may include a device which mounts each cartridge picker 38 for vertical movement with respect to the columns along a respective x' axis, the x' axis being parallel to the x axes of the columns 32 of the cartridge receptacles 30. As shown in FIGS. 1 and 2, the vertical column movement device may include a plurality of tracks 44, each track extending along a respective x' axis, and a carriage 46 which is slideably mounted thereon. As shown, the track 44 may be a square rod and the carriage 46 may be a block which slides freely or with restriction, as desired. The cartridge picker aligning and transporting apparatuses 42 may further include a device mounted to each carriage 46 for rotating a respective cartridge picker 38 about an axis z which is perpendicular to the common plane 43. This cartridge picker rotating device may include an arm 48 which is pivoted to the carriage block 46 by a pin 49 (see FIG. 3) for rotation about the z axis.

The cartridge picker aligning and transporting apparatuses 42 may further include a cartridge flipping device pivoted to each arm 48 for rotating a respective cartridge picker 38 substantially 180° about an axis z' which is parallel to the z axis and which is perpendicular to the common plane 43. The cartridge flipping device may include a shaft or pin 50 (see FIG. 3) which rotatably mounts each cartridge picker 38 to a respective arm 48. This flipping action is not required in some embodiments of the invention. For instance, if two cartridge drives 34 are utilized on consecutive columns 32, the 180° rotation about the z axis of the cartridge picker can be obtained by utilizing the next cartridge picker to take the cartridge to the next column in the succession of columns where it will be uprighted to its original position. In any arrangement it has to be kept in mind that magnetic media tape cartridges or disks must be played in an upright position whereas optical disks can be played on either side. One of the features of the invention is that the distance between pivot axes z and z' of each arm 48 is substantially one-half the distance between consecutive x axes of the columns 32 so that a cartridge can be accurately aligned and transported from column to column.

In order to realize the modular feature of the present invention, a positioning device is provided which interconnects at least two of the cartridge pickers aligning and transporting apparatuses 42 in a particular relationship with respect to the columns 32. This particular relationship allows for selective alignment of the pair of cartridge pickers for transporting cartridges between two pairs of columns, the two pairs of columns having one column which is common to both. The cartridge picker positioning device may include top and bottom braces of the framework 22, the top braces being shown at 52, 53 and 54 and the bottom braces being shown at 56, 57 and 58. These braces are supported by columns 60 and cross-braces 62. The framework braces 52, 53, 54, 56, 57 and 58 interconnect the cartridge picker aligning and transporting apparatuses 42 with the x' axis of each cartridge picker 38 lying in a plane which is equally spaced between the x axes of consecutive columns 32 and which is perpendicular to the common plane 43. As shown in FIG. 1, this is accomplished by connecting each shaft 44 to a respective top and bottom member of the framework 22, namely, top and bottom members 52 and 56, top and bottom members 53 and 57, and top and bottom members 54 and 58. The module 28 includes just one column 32 of receptacles without a cartridge picker 38 and its respective aligning and transporting apparatuses.

The modular feature of the present invention can now be appreciated in light of the above teachings. The smallest practical embodiment of the present invention includes module 24 and at least one of the modules 28. The module 24 includes a pair of cartridge receptacle columns 32, a pair of cartridge pickers 38 and a pair of cartridge picker aligning and transporting apparatuses 42. These modules 24 and 28 are basic for all embodiments. The cartridge picker assembly and library can be constructed or expanded by adding one or more of the modules 26. Each module 26 includes a single cartridge receptacle column 32, a single cartridge picker 38 and a single cartridge picker aligning and transporting apparatus 42. All of these components are pre-aligned so that when the columns 60 and cross members 62 of the modules are brought together, as shown in FIG. 1, all of the components are properly aligned for operation. If a large library is desired many modules 26 can be added to the modules 24 and 28 until the customer's needs are met. This enables simple installation or expansion of the cartridge picker assembly and library set up.

Figure 3:
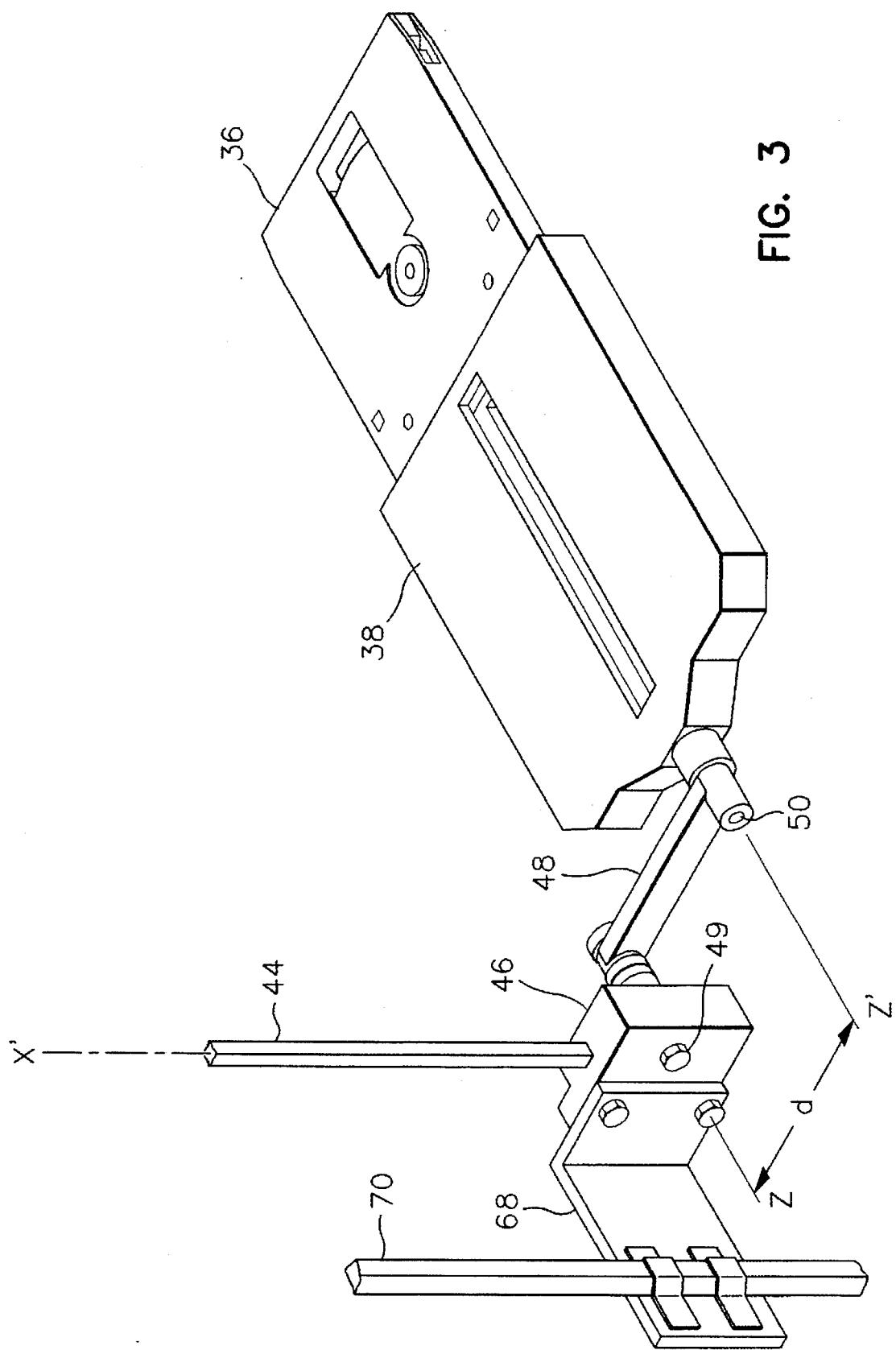
FIG. 3 is an isometric view of an exemplary single cartridge picker assembly.

One of the cartridge picker assemblies is illustrated in FIG. 3. This assembly includes an elongated track, such as the square rod 44, which has a longitudinal axis x'. The carriage 46 is mounted on the rod 44 for movement along the x' axis. The arm 48 is pivoted to the carriage 46 for rotation about the z axis, the z axis being perpendicular to a plane which includes the x' axis. The cartridge picker 38 is mounted to the arm at a distance d from the pivot axis z. In some embodiments the mounting of the cartridge picker 38 to the arm 48 is a pivotable connection with an axis of rotation z' which is parallel to the pivotal axis z. As is readily apparent, this sub-assembly of the invention is unique in and of itself.

Figure 4:
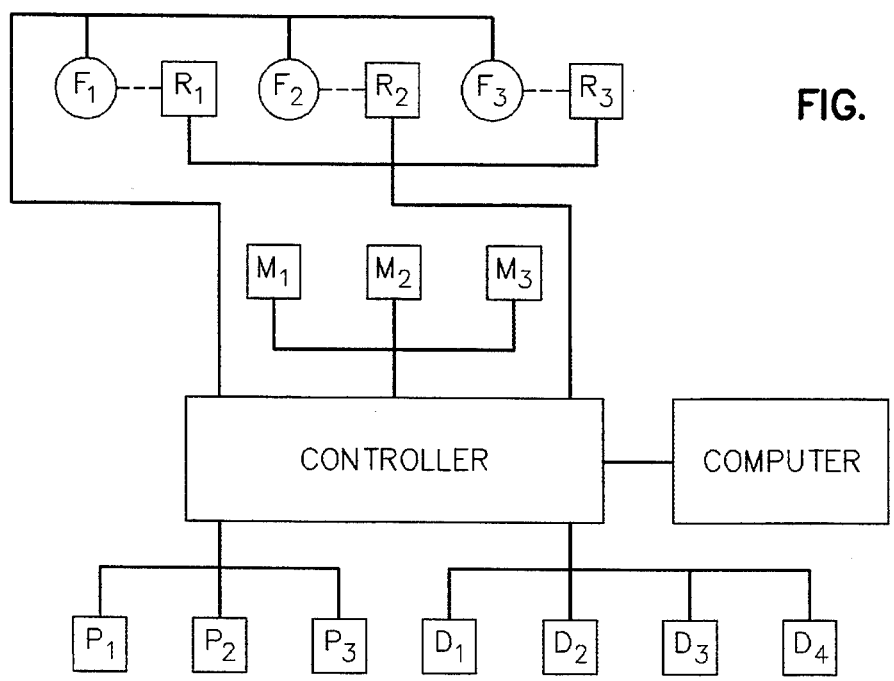
FIG. 4 is a schematic illustration of an exemplary embodiment for automatically controlling the recordable media cartridge picker assembly and library.

The components of the cartridge picker assembly and library 20 could be operated by manually positioning the cartridge pickers 38 with respect to the cartridge receptacles 30. In a preferred embodiment, all of the aligning and transporting functions of the cartridges 38 are accomplished by power devices. As shown in FIGS. 1 and 4, exemplary power devices for the vertical movement of the carriages 46 on the rods 44 may include motors $M_1$, $M_2$ and $M_3$, the first two motors being mounted to the framework member 58 and the last motor being mounted to the framework member 57. The motors have pulleys 63, and above each motor there is mounted a block 64 which has a pulley 66, each block 64 being appropriately mounted to the framework members 53 or 54. Each carriage 46 may be provided with a flange 68 which is connected to a belt 70, the belt 70 operating on the pulleys 62 and 66 when the respective motor M is operated. Each rod 44 can be rigidly fixed to a respective block 64 and one of the bottom frame members 57 and 58 for achieving the aforementioned alignment of the rod along the respective x' axis.

As shown schematically in FIG. 2 and diagrammatically in FIG. 4, the power devices for rotating the cartridge pickers about the z axes may include motors $R_1$, $R_2$ and $R_3$, and the power devices for rotating the cartridge pickers about the z' axes may include flipping motors $F_1$, $F_2$ and $F_3$. Internal motors for operating the cartridge pickers 38 are schematically illustrated at $P_1$, $P_2$ and $P_3$. Power devices are provided for operating the cartridge drives 34, some of which are schematically illustrated at $D_1$, $D_2$ and $D_3$, and $D_4$ in FIG. 2 and all of them being diagrammatically illustrated in FIG. 4.

FIG. 4 illustrates an exemplary robotic system for automatically controlling the various functions of the aforementioned cartridge picker assembly and library 20. As shown, the cartridge picker power devices $P_1$, $P_2$ and $P_3$, the cartridge picker vertical column movement power devices $M_1$, $M_2$ and $M_3$, the cartridge picker rotating power devices $R_1$, $R_2$ and $R_3$, the cartridge picker flipping power devices $F_1$, $F_2$ and $F^3$, and the drive power devices $D_1$, $D_2$ and $D_3$ and $D_4$ are connected to a controller 72. The controller 72 is, in turn, connected to a computer 74 which has a program for robotically obtaining the desired operative functions of the cartridge picker assembly and library 20.

Figure 5:
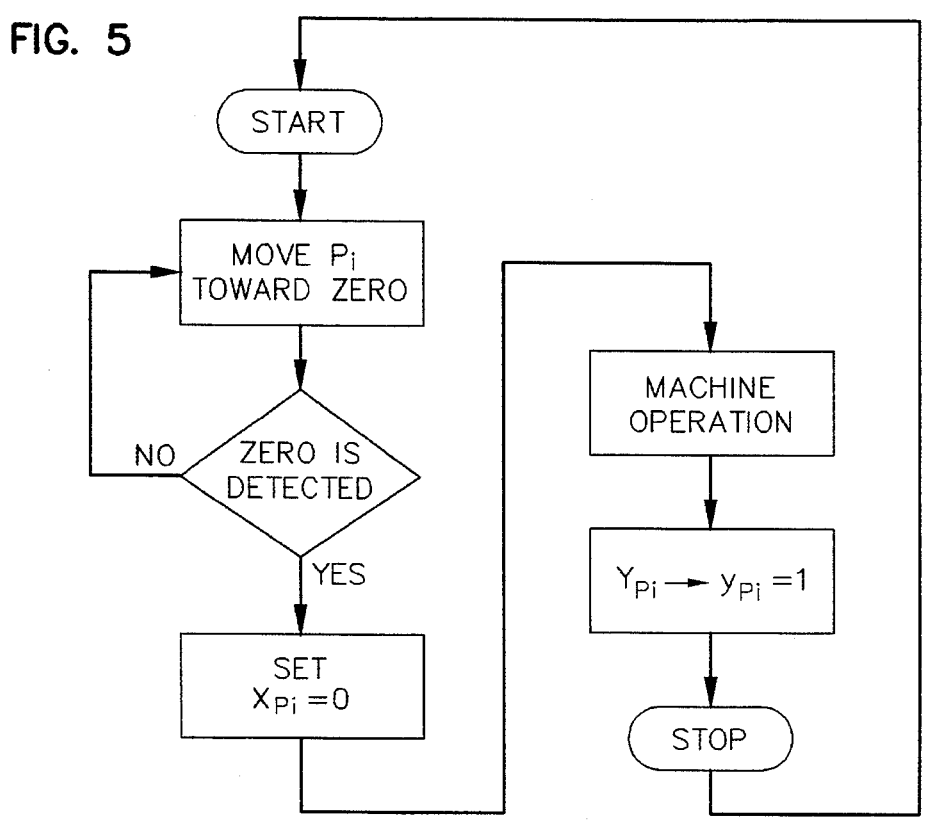
FIGS. 5, 6A and 6B are logic block diagrams of an exemplary computer program for operating the functions of the recordable media cartridge picker assembly and library.

An exemplary program for the computer 74 is illustrated in FIGS. 5 and 6. This program shows the logic for operating one of the pickers $P_i$ so that it does not collide with the picker to the right which is $P_{i+1}$ or the picker to the left which is $P_{i-1}$. The logic for a plurality of pickers will be the same as that shown in FIGS. 5 and 6 for picker $P_i$ with a minor exception which will be explained hereinafter. The picker position with respect to a zero point in the x direction can be monitored by a digital encoder mounted to respective motors $M_1$, $M_2$ and $M_3$. The zero point may be determined by a sensor which detects the picker present at one extremity of its travel in the x direction. The overall logic for operating a particular picker $P_i$ is illustrated in FIG. 5. When the picker $P_i$ receives a start signal, it will move to zero which may be the bottommost location within a respective column 32. When the picker $P_i$ reaches zero, then is set to zero, after which the machine operation shown in FIG. 6 can commence. After completion of the machine operation, the position of the picker is placed to the right if it is not already in that location, this right position being indicated by a 1. After the picker is on the right side of its track, the operation is stopped.

Figure 6A:
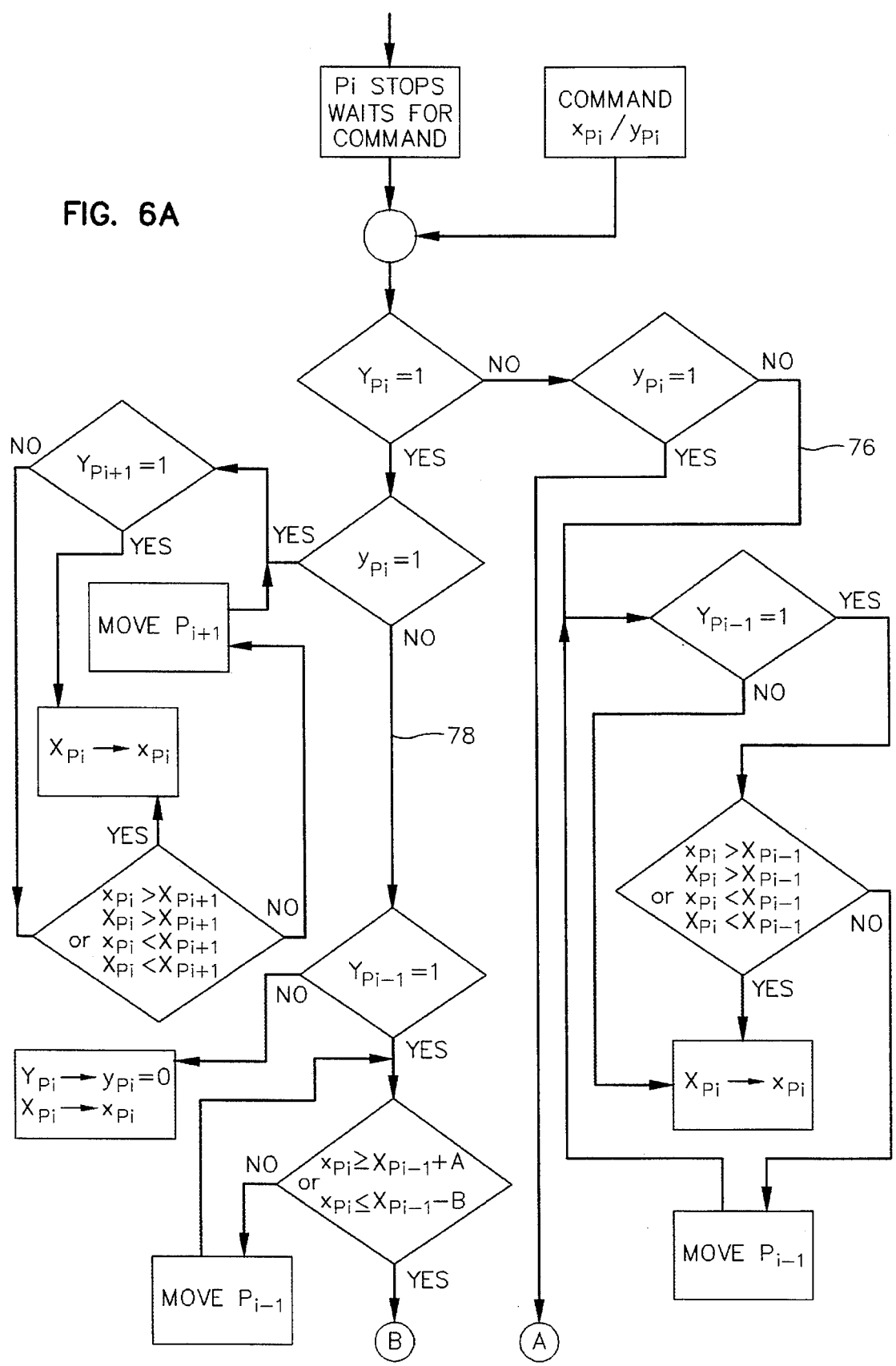
Figure 6B:
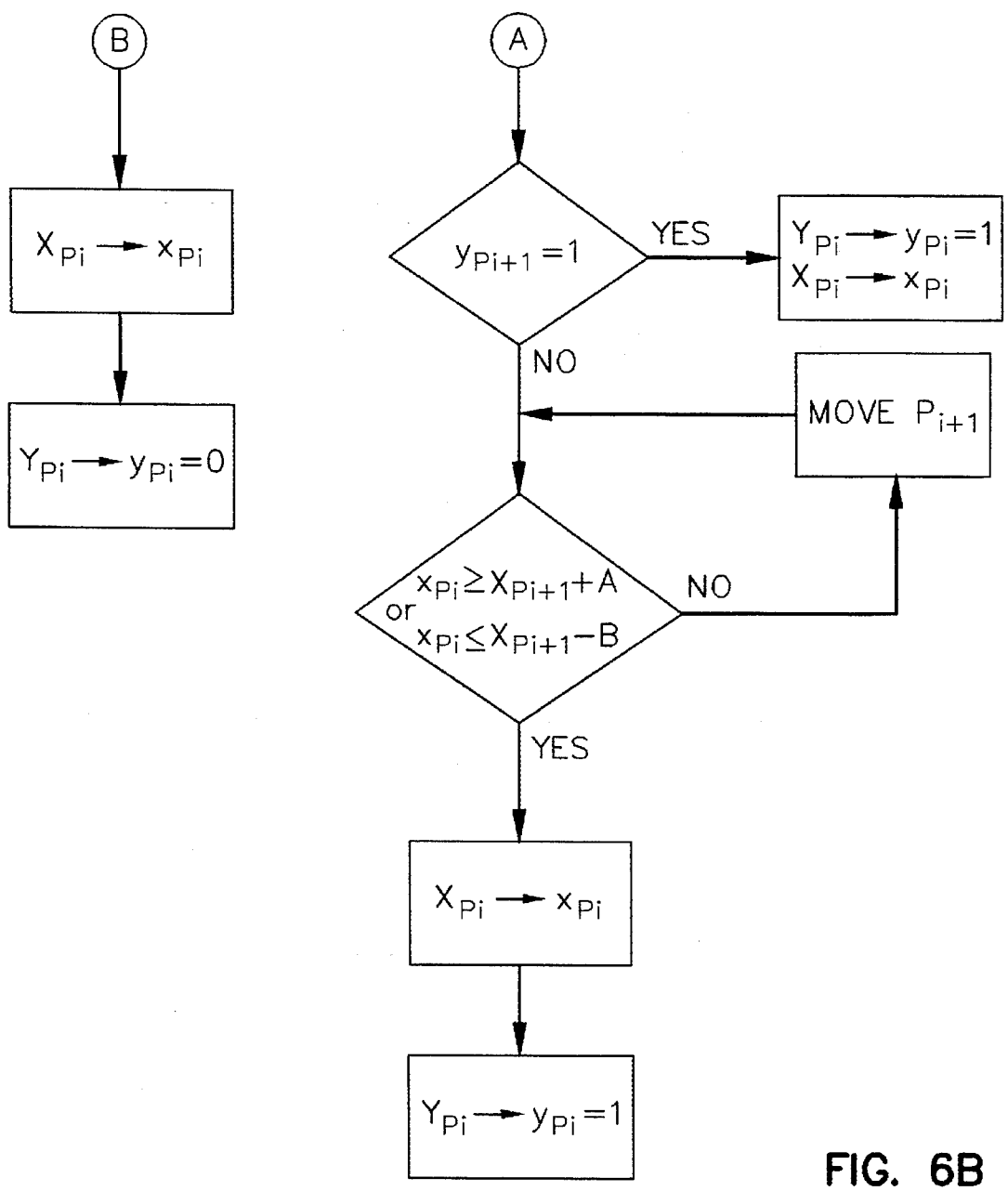

In order to understand the logic of FIG. 6A and 6B, a portion of the right side of these figures is explained herein. At the top, the picker $P_i$ is waiting for a command. When the command $x_{pi}$, $y_{pi}$ is given, the first decision to be made is whether the position of the picker is to the right side of its track. If the answer is no, we move to the right on the logic diagram and the question is asked whether the position where the picker is to go to is on the right. If the answer is no, the decision is made whether the picker to the left $Y_{pi-1}$ is located on the right of its track. If the answer is yes, the following decision is made, namely: is the position that the picker is to go to greater than the present position of the picker to the left and is the present position of the picker to be moved greater than the present position of the picker to the left, or is the position that the picker is to be moved to less than the present position of the picker to the left and is the present position of the picker to be moved less than the present position of the picker to the left. If the answer to this is yes, then the picker to be moved can be moved from its present position $X_{pi}$ to the designated position $x_{pi}$. If the answer is no, then the picker to the left, $P_{i-1}$, is moved and the cycle is repeated until the picker to the left is out of the way.

Going back to the beginning after a command $x_{pi}$, $y_{pi}$ lets assume that the answer to the present position of the picker being to the right of its track is still no. The question asked then is whether the position $y_{pi}$ is to the right of the track. If the answer is yes, the next question is whether the picker to the right $Y_{pi+1}$ is to the right of its track If the answer is no, the pickers $Y_{pi}$ and $Y_{pi+1}$ may collide. The next question is whether the designated position to move to, $x_{pi}$, is greater than or equal to the present location of the picker to the right, $X_{pi+1}$ plus a constant "A" or is the designated x position that the picker is to move to, $x_{pi}$, less than or equal to the present position of the picker to the right, $X_{pi+1}$, minus a constant "B". The constants "A" and "B" represent the amount of space required for the picker to be moved to clear the picker to the right when it is moved from its position to the left of its track to the position to the right of its track. If the answer to these questions is yes, then the present position of the picker to be moved, $X_{pi}$, is moved to the designated position, $x_{pi}$, and the picker is moved from its left position to its right position as shown in FIG. 6B. The explanation hereinabove is for the operation of one picker. For operation of multiple pickers, additional decisions have to be made at locations 76 and 78 in the flow diagram. For multiple pickers, the decision would have to be made at 76 whether the designated position $y_{pi}=0$, namely whether the designated position is to the left of the track of the picker in question. If the answer is no, there are two no's indicating that the designated position is neither to the right or to the left of the picker in question. In this instance, the program would sequence to the next picker, for instance the picker to the right, and start the flow diagram all over again. This operation would sequence through consecutive pickers until a double no had not been received so that the picker in question is the one that can actually perform the operation. The same would be true for location 78 on the flow diagram where the question would be asked whether the designated y position $y_{pi}=0$, namely whether it is to the left of the track of the picker in question. If the answer is no, this means that the designated position is neither to the right or the left of the picker in question and the program would sequence to the next picker until a double no situation is eliminated. The explanation hereinabove provides a teaching of a program to operate the pickers so that they will go to designated positions without colliding. The operation of the drives $D_1$–$D_4$ for the cartridge drives 34, the operation of the picker motors $P_1$–$P_3$, and the operation of the flipping motors $F_1$–$F_3$ are obvious in conjunction with the aforementioned described operation of the pickers in the x and y directions.

It can now be appreciated that the present invention provides a very novel and unique arrangement for a cartridge picker assembly and/or library. With the teachings of this invention, the cartridge pickers, their aligning and transporting devices and the columns 32 of cartridge receptacles 30 can be arranged for modular construction or expansion of a robotic library. With this arrangement, the customer's size needs can be easily met during original construction and/or expansion of the library. The manufacturer's inventory can be kept low, manufacturing can be kept simple, and most of the library can be kept operational when one of the modules fails.

Although the invention has been described in terms of the specific embodiment, the inventor contemplates modifications and substitutions to various components of the invention would occur to the person of ordinary skill in the art, and therefore, would be in the scope of the invention, which is to be limited only by the claims which follows.

I claim:

1. A recordable media cartridge picker assembly and library, the library having a vertically extending height and a horizontally extending length, comprising:

library means having a plurality of cartridge receptacles arranged in first and second adjacent columns and second and third adjacent columns, the first, second and third columns being consecutive in a side by side adjacent relationship so as to provide vertically stacked rows of cartridge receptacles;

first and second cartridge pickers, each cartridge picker being capable of removing and inserting a cartridge with respect to a cartridge receptacle when aligned therewith;

first means for selectively swinging the first cartridge picker back and forth between only one pair of adjacent columns of said first, second and third columns for aligning the cartridge picker with cartridge receptacles in one or the other of said pair of adjacent columns and for transporting cartridges therebetween;

second means for selectively swinging the second cartridge picker back and forth between only one pair of adjacent columns of said first, second and third columns for aligning the cartridge picker with cartridge receptacles in one or the other of said pair of adjacent columns and for transporting cartridges therebetween; and means fixedly interconnecting the first and second means with respect to the columns along the length of the library for restricting alignment of the first cartridge picker with cartridge receptacles in only said first and second adjacent columns and for restricting alignment of the second cartridge picker with cartridge receptacles in only said second and third adjacent columns.

2. A recordable media cartridge picker assembly and library as claimed in claim 1 including:

a plurality of side by side separable modules, each module having a framework; and at least one of the modules having only one of said first, second and third columns and only one of said first and second cartridge pickers mounted to its framework.

3. A recordable media cartridge picker assembly and library as claimed in claim 2 wherein each column of cartridge receptacles has a respective vertical x axis and a respective horizontal y axis which intersect perpendicularly substantially at the center thereof and are parallel with the x and y axes respectively of each other column of cartridge receptacles, the x and y axes of all of the columns lying substantially in a common vertical plane, each first and second means including;

vertical movement means movable along a respective x' axis which is parallel to the x axes of the columns of cartridge receptacles for vertically moving a respective cartridge picker, the vertical movement means being fixed along the length of the library means; and rotating means mounted to the vertical movement means for swinging the respective cartridge picker about a z axis, which is perpendicular to said common vertical plane, between a first position, which aligns the respective cartridge picker with cartridge receptacles in one of said columns when the cartridge picker is swung 90° in one direction by said rotating means, and a second position, which aligns the respective cartridge picker with cartridge receptacles in an adjacent column when the cartridge picker is swung 90° in an opposite direction by said rotating means.

4. A recordable media cartridge picker assembly and library as claimed in claim 3 wherein the means for fixedly interconnecting the first and second means is also for fixedly positioning the z axis of each rotating means so that each z axis lies fixed for movement in only one respective vertical plane which is equally spaced between the x axes of adjacent columns and which is perpendicular to said common vertical plane.

5. A recordable media cartridge picker assembly and library, as claimed in claim 4, including:

the vertical movement means for each cartridge picker including:

a track which extends along a respective x' axis and which is fixed along the length of the library and a carriage slideably mounted on each respective track; and each rotating means including:

an arm having first and second ends;

the first end of the arm being pivotally connected to the carriage so that the second end of the arm can be swung about a respective z axis; and the second end of the arm being connected to a respective cartridge picker.

6. A recordable media cartridge picker assembly and library, as claimed in claim 5, including:

a plurality of cartridge drives, each drive having a cartridge receptacle;

each of the columns including a cartridge drive.

7. A module for a recordable media cartridge library wherein the library includes a plurality of modules mounted in a side by side adjacent relationship, the module comprising:

a framework;

only one column of receptacles mounted to the framework for receiving recordable media cartridges;

the column of receptacles having a vertically extending x axis and a horizontally extending y axis, the x and y axes intersecting one another substantially at the center of the column and forming a vertical plane;

only one cartridge picker assembly mounted to the framework;

the cartridge picker assembly including:
- a track fixedly mounted to the framework along a vertically extending x' axis which is parallel to said vertical plane;
- a carriage mounted on the track for vertical movement therealong;
- an arm having first and second ends;
- the first end of the arm being pivotally connected to the carriage so that the second end of the arm can swing about a z axis which is perpendicular to said vertical plane and which is substantially coextensive with a side of the framework;
- an entire cartridge picker connected to a second end of the arm; and
- the second end of the arm being rotatable about said z axis for swinging the entire cartridge picker 180 degrees between first and second positions which are located in a horizontal plane, the first position positioning the entire cartridge picker inside the framework in alignment with receptacles of the column of receptacles and the second position positioning the entire cartridge picker outside the framework for alignment with receptacles of an adjacent column of receptacles of another module in the library.

8. A module for a recordable media cartridge library wherein the library includes a plurality of modules mounted in a side by side relationship, the module comprising:

a framework;

only one column of receptacles mounted to the framework for receiving recordable media cartridges;

the column of receptacles having a vertically extending x axis and a horizontally extending y axis, the x and y axes intersecting one another substantially at the center of the column and forming a vertical plane;

only one cartridge picker assembly mounted to the framework;

the cartridge picker assembly including:
- a track mounted to the framework along a vertically extending x' axis which is parallel to said vertical plane;
- a carriage mounted on the track for vertical movement therealong;
- an arm having a first end pivotally connected to the carriage for rotation about a z axis which is perpendicular to said vertical plane and which is coextensive with a side of the framework;
- a cartridge picker connected to a second end of the arm; and
- the second end of the arm being rotatable about said z axis for swinging the cartridge picker 180 degrees between first and second positions which are located in a horizontal plane, the first position positioning the cartridge picker inside the framework in alignment with receptacles of the column of receptacles and the second position positioning the cartridge picker outside the framework for alignment with receptacles of an adjacent column of receptacles of another module in the library; and
- the cartridge picker being pivotally connected to the second end of the arm for rotation 180 degrees about a z' axis which is parallel to the z axis.

* * * * *